(12) United States Patent
Shi et al.

(10) Patent No.: US 9,204,490 B2
(45) Date of Patent: Dec. 1, 2015

(54) BASE STATION INSTALLATION APPARATUS INCLUDED IN BASE STATION, AND BASE STATION

(71) Applicant: Huawei Technologies Co., Ltd., Shenzhen, Guangdong (CN)

(72) Inventors: Chang Shi, Shanghai (CN); Chunbo Zhao, Shanghai (CN); Minghui Zheng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/584,757

(22) Filed: Dec. 29, 2014

(65) Prior Publication Data

US 2015/0163855 A1    Jun. 11, 2015

Related U.S. Application Data

(63) Continuation of application No. PCT/CN2014/071924, filed on Feb. 10, 2014.

(30) Foreign Application Priority Data

Dec. 6, 2013  (CN) .......................... 2013 1 0656150

(51) Int. Cl.
*H04W 88/08* (2009.01)
*E05D 5/10* (2006.01)

(52) U.S. Cl.
CPC .................. *H04W 88/08* (2013.01); *E05D 5/10* (2013.01); *E05D 2005/108* (2013.01)

(58) Field of Classification Search
CPC .... E05D 2005/108; E05D 5/10; H04W 88/08
USPC ............. 455/561, 575.1, 550.1, 556.2, 67.15, 455/3.02, 117
See application file for complete search history.

(56) References Cited

U.S. PATENT DOCUMENTS

| | | | |
|---|---|---|---|
| 6,411,274 B2 | 6/2002 | Watanabe et al. | |
| 6,735,450 B1 * | 5/2004 | Remmert ................ | H04B 1/38 361/688 |
| 7,162,258 B2 * | 1/2007 | Beach ................ | H05B 37/0272 370/217 |
| 7,184,422 B2 * | 2/2007 | Tseng ................. | H05K 5/0204 370/338 |
| 8,014,826 B2 * | 9/2011 | Baldwin ............... | H05K 7/186 361/679.33 |
| 2006/0211451 A1 * | 9/2006 | Pak ........................ | H02G 3/123 455/561 |
| 2007/0026895 A1 * | 2/2007 | Capece ................. | H04W 88/08 455/561 |
| 2007/0254714 A1 * | 11/2007 | Martich .............. | H04M 1/0293 455/561 |
| 2008/0080158 A1 | 4/2008 | Crocker et al. | |
| 2009/0036167 A1 * | 2/2009 | Sterner ............. | H05K 7/20572 455/561 |
| 2010/0185976 A1 | 7/2010 | Sadanandan | |
| 2011/0177844 A1 | 7/2011 | Lowas, III | |
| 2015/0156818 A1 * | 6/2015 | Kim ....................... | H04Q 1/025 455/561 |

FOREIGN PATENT DOCUMENTS

CN         2886004 Y       4/2007
CN       101534456 A       9/2009
* cited by examiner

*Primary Examiner* — Babar Sarwar

(57) ABSTRACT

A base station installation apparatus included in a base station, and a base station are disclosed. The base station installation apparatus included in a base station may include a front housing, N substrates, an elastic component, and a back housing, where the N substrates are secured on the elastic component, the elastic component is secured on the back housing or the front housing, and the substrate is configured to secure a base station processing module; the elastic component can drive the N substrates to be arranged in a straight line, and the elastic component can also drive, by deformation, the N substrates to be arranged in a curve; and the front housing and the back housing are each provided with a deformable structure, so that the front housing and the back housing can deform adaptively as the elastic component deforms, where N is an integer greater than 1.

10 Claims, 6 Drawing Sheets

BASE STATION INSTALLATION APPARATUS INCLUDED IN BASE STATION, AND BASE STATION

CROSS-REFERENCE TO RELATED APPLICATION

This application is a continuation of International Application No. PCT/CN2014/071924, filed on Feb. 10, 2014, which claims priority to Chinese Patent Application No. 201310656150.3, filed on Dec. 6, 2013, both of which are hereby incorporated by reference in their entireties.

TECHNICAL FIELD

The present invention relates to the field of processing and manufacturing of a communications device, and in particular, to a base station installation apparatus included in a base station, and a base station.

BACKGROUND

With the development of communications technologies and terminal devices, the next decade will witness an exponential growth of a user demand for voice and data traffic in a mobile network. As the density of traditional macro base stations is approaching a saturation point and it is increasingly difficult to acquire a new site, small-cell base stations are being accepted by operators as a solution to network congestion.

In addition, because small-cell base stations are installed in various scenarios and are mainly installed in hot spot regions, residential areas, and other populated areas of a city, higher requirements are raised on device forms, scenario adaptability, disguise, environmental harmony, and the like of small-cell base stations. An existing small-cell base station is basically in the form of one or more square boxes, and the form is fixed when the small-cell base station is installed against a wall or on a pole. In this way, a mismatch may occur between the small-cell base station and a surrounding environment and as a result it is difficult to blend the small-cell base station with the surrounding environment.

SUMMARY

Embodiments of the present invention provide a base station installation apparatus included in a base station, and a base station, so as to improve flexibility and variability of an installation form of a base station as much as possible, thereby improving an extent of blending the installation form of the base station with an environment.

In order to solve the preceding technical problems, the embodiments of the present invention provide the following technical solutions:

A first aspect of the present invention provides a base station installation apparatus included in a base station, which may include:

a front housing, N substrates, an elastic component, and a back housing, where the N substrates are secured on the elastic component, the elastic component is secured on the back housing or the front housing, and the substrate is configured to secure a base station processing module; and the elastic component can drive the N substrates to be arranged in a straight line, and the elastic component can also drive, by deformation, the N substrates to be arranged in a curve; and the front housing and the back housing are each provided with a deformable structure, so that the front housing and the back housing can deform adaptively as the elastic component deforms, where N is an integer greater than 1.

With reference to the first aspect, in a first possible implementation manner, the deformable structure includes a soft-material component, so that the front housing and the back housing can deform adaptively as the elastic component deforms.

With reference to the first aspect or the first possible implementation manner of the first aspect, in a second possible implementation manner, the base station installation apparatus further includes a deformable hinge pin, where the N substrates are further provided with hinge pin jacks, and a rigid hinge pin can be inserted into a hinge pin jack on at least one substrate of the N substrates or the rigid hinge pin can be partially or entirely pulled out of the hinge pin jacks on the N substrates.

With reference to the first aspect or the second possible implementation manner of the first aspect, in a third possible implementation manner, the deformable hinge pin includes:

N hinge pin subsections and a rotating shaft connecting the N hinge pin subsections, where the N hinge pin subsections are in a one-to-one correspondence with the N substrates, and the length of any hinge pin subsection of the N hinge pin subsections fits the width of a substrate corresponding to any of the hinge pin subsections.

With reference to the first aspect or the second possible implementation manner of the first aspect, in a fourth possible implementation manner, the base station installation apparatus further includes the rigid hinge pin, where the N substrates are further provided with hinge pin jacks, where the rigid hinge pin can be partially or entirely inserted into the hinge pin jacks on the N substrates, and/or the rigid hinge pin can be partially or entirely pulled out of the hinge pin jacks on the N substrates.

With reference to the first aspect or the first possible implementation manner of the first aspect or the second possible implementation manner of the first aspect or the third possible implementation manner of the first aspect or the fourth possible implementation manner of the first aspect, in a fifth possible implementation manner, a detachable or an undetachable heat dissipation device is disposed on a surface, in contact with an installation interface, of the back housing.

With reference to the fifth possible implementation manner of the first aspect, in a sixth possible implementation manner, the heat dissipation device is made of a flexible material provided with a heat dissipation air duct.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect, in a seventh possible implementation manner, the front housing includes: N rigid protective sheets in a one-to-one correspondence with the N substrates and a flexible connecting piece that connects the N rigid protective sheets.

With reference to the seventh possible implementation manner of the first aspect, in an eighth possible implementation manner, the flexible connecting piece is a stretchable flexible connecting piece.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect or the seventh possible implementation manner of the first aspect or the eighth possible implementation manner of the first aspect, in a ninth possible implementation manner, there is one or at least two elastic components.

A second aspect of the present invention provides a base station, which may include:

a base station installation apparatus, where the base station installation apparatus includes:

a front housing, N substrates, an elastic component, and a back housing, where the N substrates are secured on the elastic component, the elastic component is secured on the back housing or the front housing, and the substrate is configured to secure a base station processing module; and the elastic component can drive the N substrates to be arranged in a straight line, and the elastic component can also drive, by deformation, the N substrates to be arranged in a curve; and the front housing and the back housing are each provided with a deformable structure, so that the front housing and the back housing can deform adaptively as the elastic component deforms, where N is an integer greater than 1.

At least one substrate of the N substrates in the base station installation apparatus has the base station processing module secured thereon.

With reference to the second aspect, in a first possible implementation manner, the deformable structure includes a soft-material component, so that the front housing and the back housing can deform adaptively as the elastic component deforms.

With reference to the second aspect or the first possible implementation manner of the second aspect, in a second possible implementation manner, the base station installation apparatus further includes a deformable hinge pin, where the N substrates are further provided with hinge pin jacks, and a rigid hinge pin can be inserted into a hinge pin jack on at least one substrate of the N substrates, or the rigid hinge pin can be partially or entirely pulled out of the hinge pin jacks on the N substrates.

With reference to the second aspect or the second possible implementation manner of the second aspect, in a third possible implementation manner, the deformable hinge pin includes:

N hinge pin subsections and a rotating shaft connecting the N hinge pin subsections, where the N hinge pin subsections are in a one-to-one correspondence with the N substrates, and the length of any one hinge pin subsection of the N hinge pin subsections fits the width of a substrate corresponding to any of the hinge pin subsections.

With reference to the second aspect or the second possible implementation manner of the second aspect, in a fourth possible implementation manner, the base station installation apparatus further includes a rigid hinge pin, where the N substrates are further provided with hinge pin jacks, and the rigid hinge pin can be partially or entirely inserted into the hinge pin jacks on the N substrates, and/or the rigid hinge pin can be partially or entirely pulled out of the hinge pin jacks on the N substrates.

With reference to the second aspect or the first possible implementation manner of the second aspect or the second possible implementation manner of the second aspect or the third possible implementation manner of the second aspect or the fourth possible implementation manner of the second aspect, in a fifth possible implementation manner, a detachable or an undetachable heat dissipation device is disposed on a surface, in contact with an installation interface, of the back housing.

With reference to the fifth possible implementation manner of the second aspect, in a sixth possible implementation manner, the heat dissipation device is made of a flexible material provided with a heat dissipation air duct.

With reference to the second aspect or the first possible implementation manner of the second aspect or the second possible implementation manner of the second aspect or the third possible implementation manner of the second aspect or the fourth possible implementation manner of the second aspect or the fifth possible implementation manner of the second aspect or the sixth possible implementation manner of the second aspect, in a seventh possible implementation manner, the front housing includes: N rigid protective sheets in a one-to-one correspondence with the N substrates and a flexible connecting piece that connects the N rigid protective sheets.

With reference to the seventh possible implementation manner of the second aspect, in an eighth possible implementation manner, the flexible connecting piece is a stretchable flexible connecting piece.

With reference to the second aspect or the first possible implementation manner of the second aspect or the second possible implementation manner of the second aspect or the third possible implementation manner of the second aspect or the fourth possible implementation manner of the second aspect or the fifth possible implementation manner of the second aspect or the sixth possible implementation manner of the second aspect or the seventh possible implementation manner of the second aspect or the eighth possible implementation manner of the second aspect, in a ninth possible implementation manner, there is one or at least two elastic components.

With reference to the second aspect or the first possible implementation manner of the second aspect or the second possible implementation manner of the second aspect or the third possible implementation manner of the second aspect or the fourth possible implementation manner of the second aspect or the fifth possible implementation manner of the second aspect or the sixth possible implementation manner of the second aspect or the seventh possible implementation manner of the second aspect or the eighth possible implementation manner of the second aspect or the ninth possible implementation manner of the second aspect, in a tenth possible implementation manner, the base station processing module is secured on the substrate by using a slot disposed on the substrate.

With reference to the second aspect or the first possible implementation manner of the second aspect or the second possible implementation manner of the second aspect or the third possible implementation manner of the second aspect or the fourth possible implementation manner of the second aspect or the fifth possible implementation manner of the second aspect or the sixth possible implementation manner of the second aspect or the seventh possible implementation manner of the second aspect or the eighth possible implementation manner of the second aspect or the ninth possible implementation manner of the second aspect or the tenth possible implementation manner of the second aspect, in an eleventh possible implementation manner, the base station processing module includes at least one of the following modules: a baseband module, a radio frequency module, an antenna module, a power source module, a signal transmission device, and a backup power module.

It can be seen from the foregoing that the base station installation apparatus included in a base station provided by some embodiments of the present invention mainly includes a front housing, N substrates, an elastic component, and a back housing, where the N substrates are secured on the elastic component, and the elastic component is secured on the back housing and/or the front housing; by performing modular arrangement for a base station processing module, the elastic component can drive the N substrates to be arranged in a straight line, and the elastic component can also drive, by deformation, the N substrates to be arranged in a curve; and the front housing and the back housing are each provided with a deformable structure, so that the front housing and the back housing can deform adaptively as the elastic component deforms. In this way, an installation form of the base station can be an unrolled form (for example, in a scenario in which the elastic component drives the N substrates to be arranged in a straight line), and can also be a rolled-up or partially rolled-up form (for example, in a scenario in which the elastic component drives the N substrates to be arranged in a curve (for example, arranged in a closed curve)). By using such a structure, a base station can be in various installation forms, which is conducive to enhancing an extent of blending the installation form of the base station with an environment.

The base station provided by some other embodiments of the present invention includes a front housing, N substrates, an elastic component, and a back housing, where the N substrates are secured on the elastic component, and the elastic component is secured on the back housing and/or the front housing; by performing modular arrangement for a base station processing module, the elastic component can drive the N substrates to be arranged in a straight line, and the elastic component can also drive, by deformation, the N substrates to be arranged in a curve; and the front housing and the back housing are each provided with a deformable structure, so that the front housing and the back housing can deform adaptively as the elastic component deforms. In this way, an installation form of the base station can be an unrolled form (for example, in a scenario in which the elastic component drives the N substrates to be arranged in a straight line), and can also be a rolled-up or partially rolled-up form (for example, in a scenario in which the elastic component drives the N substrates to be arranged in a curve (for example, arranged in a closed curve)). By using such a structure, a base station can be in various installation forms, which is conducive to enhancing an extent of blending the installation form of the base station with an environment.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
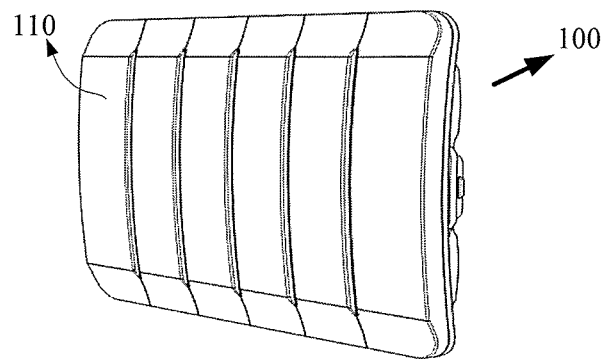
FIG. 1 is a schematic front view of a base station 100 in an unrolled state according to an embodiment of the present invention.

Embodiments of the present invention provide a base station installation apparatus included in a base station, and a base station, so as to improve flexibility and variability of an installation form of a base station as much as possible, thereby improving an extent of blending the installation form of the base station with an environment.

To make the invention objectives, features, and advantages of the present invention clearer and more comprehensible, the following clearly describes the technical solutions in the embodiments of the present invention with reference to the accompanying drawings in the embodiments of the present invention. Apparently, the embodiments described in the following are merely a part rather than all of the embodiments of the present invention. All other embodiments obtained by a person of ordinary skill in the art based on the embodiments of the present invention without creative efforts shall fall within the protection scope of the present invention.

The embodiments are separately described in detail in the following.

An embodiment of the present invention provides a base station, which may include: a front housing, N substrates, an elastic component, and a back housing. The N substrates are secured on the elastic component, and the elastic component is secured on the back housing and/or the front housing. At least one substrate of the N substrates has a base station processing module secured thereon.

The elastic component can drive the N substrates to be arranged in a straight line, and the elastic component can also drive, by deformation, the N substrates to be arranged in a curve. The front housing and the back housing are each provided with a deformable structure, so that the front housing and the back housing can deform adaptively as the elastic component deforms (for example, the deformable structure may include a soft-material component (the soft-material component may be a part of the front housing or the back housing, or the front housing or the back housing may be formed of the soft-material component) or a movable component (the movable component may be a part of the front housing or the back housing, or the front housing or the back housing may be formed of the movable component), so that the front housing and the back housing can deform adaptively as the elastic component deforms), where N is an integer greater than 1.

In embodiments of the present invention, the base station processing module mainly refers to a module providing functions related to a communication function of the base station. The base station processing module includes at least one of the following modules: a baseband module, a radio frequency module, an antenna module, a power source module, a signal transmission device, and a backup power module. Certainly, the base station processing module may also be another module providing functions related to a communication function of the base station.

The substrate is configured to secure the base station processing module, which may be implemented in multiple possible implementation manners. For example, in some embodiments of the present invention, the base station processing module may be secured on the substrate by using a slot disposed on the substrate. That is, the base station processing module may be secured on the substrate in a pluggable manner for convenience of disassembly. Certainly, the base station processing module may also be secured on the substrate by means of screwing, welding, or clamping or in other manners.

For example, the base station may include N base station processing modules, where each of the N base station processing modules is secured on a corresponding substrate of the N substrates, that is, different base station processing modules are secured on different substrates. Certainly, one substrate may also have multiple base station processing modules secured thereon, or some substrates may even have no base station processing module secured thereon.

It can be seen that the base station includes a front housing, N substrates, an elastic component, and a back housing, where the N substrates are secured on the elastic component, and the elastic component is secured on the back housing and/or the front housing; by performing modular arrangement for a base station processing module, the elastic component can drive the N substrates to be arranged in a straight line, and the elastic component can also drive, by deformation, the N substrates to be arranged in a curve; and the front housing and the back housing are each provided with a deformable structure, so that the front housing and the back housing can deform adaptively as the elastic component deforms. In this way, an installation form of the base station can be an unrolled form (for example, in a scenario in which the elastic component drives the N substrates to be arranged in a straight line), and can also be a rolled-up or partially rolled-up form (for example, in a scenario in which the elastic component drives the N substrates to be arranged in a curve (for example, arranged along a closed curve)). By using such a structure, a base station can be in various installation forms, which is conducive to enhancing an extent of blending the installation form of the base station with an environment.

In some embodiments of the present invention, there may be one or at least two elastic components. It can be understood that disposing multiple elastic components in the base station helps improve installation stability and reliability of the base station, and also reduce tools for installing the base station because the elastic component can function as a hoop to some extent.

In some embodiments of the present invention, the base station further includes a rigid hinge pin, where the N substrates are further provided with hinge pin jacks, where the rigid hinge pin can be inserted into a hinge pin jack on at least one substrate of the N substrates, and/or the rigid hinge pin can be partially or entirely pulled out of a hinge pin jack on at least one substrate of the N substrates. An unrolling degree of the base station can be flexibly controlled by inserting/pulling the rigid hinge pin into/out of a hinge pin jack on at least one substrate of the N substrates. For example, when the rigid hinge pin is inserted into all the hinge pin jacks on the N substrates, due to restraint from the rigid hinge pin, in this condition, the elastic component can drive the N substrates to be arranged in a straight line, but it is difficult for the elastic component to drive, by deformation, the N substrates to be arranged in a curve. When the rigid hinge pin is inserted into hinge pin jacks of some substrates of the N substrates, because the rigid hinge pin restrains, to some extent, some substrates of the N substrates from being arranged in a curve, in this condition, the elastic component can drive the N substrates to be arranged in a straight line, and the elastic component can also drive, by deformation, some substrates of the N substrates to be arranged in a curve. When the rigid hinge pin is pulled out of the hinge pin jacks on the N substrates, because restraint from the rigid hinge pin does not exist any longer, in this condition, the elastic component can drive the N substrates to be arranged in a straight line, and the elastic component can also drive, by deformation, a part or all of the N substrates to be arranged in a curve.

In some other embodiments of the present invention, the base station further includes a deformable hinge pin, where the N substrates are further provided with hinge pin jacks, where the deformable hinge pin can be inserted into a hinge pin jack on at least one substrate of the N substrates, and/or the deformable hinge pin can be partially or entirely pulled out of a hinge pin jack on at least one substrate of the N substrates. An unrolling degree of the base station can be flexibly controlled by partially or entirely inserting/pulling the deformable hinge pin into/out of a hinge pin jack on at least one substrate of the N substrates.

In some embodiments of the present invention, the deformable hinge pin may include: N hinge pin subsections and a rotating shaft connecting the N hinge pin subsections, where the N hinge pin subsections are in a one-to-one correspondence with the N substrates, and the length of any hinge pin subsection of the N hinge pin subsections fits the width of a substrate corresponding to any of the hinge pin subsections. For example, the length of any hinge pin subsection of the N hinge pin subsections is less than or equal to the width of a substrate corresponding to any of the hinge pin subsections. A deformable hinge pin, which uses a rotating shaft to connect N hinge pin subsections, can flexibly control an unrolling degree of the base station. For example, when each hinge pin subsection and the corresponding substrate completely overlap, because the rotating shaft is rotatable, in this condition, the elastic component can drive the N substrates to be arranged in a straight line, and the elastic component can also drive, by deformation, the N substrates to be arranged in a curve. Therefore, the N substrates can be in an unrolled form and a rolled-up or partially rolled-up form. When each hinge pin subsection and the corresponding substrate do not completely overlap, because the hinge pin subsection restrains, to a great extent, the N substrates from being arranged in a curve, in this condition, the elastic component can drive the N substrates to be arranged in a straight line, but it is difficult for the elastic component to drive, by deformation, the N substrates to be arranged in a curve. Therefore, the N substrates can be in an unrolled form, but it is difficult to make the N substrates be in a rolled-up form.

In some embodiments of the present invention, a detachable or an undetachable heat dissipation device may be further disposed on a surface, in contact with an installation interface, of the back housing. The heat dissipation device may be made of, for example, a flexible material (for example, rubber) provided with a heat dissipation air duct. The installation interface generally refers to a surface of a carrier on which the base station is installed. For example, if the base station is installed on a wall surface, the wall surface may be referred to as an installation interface. For another example, if the base station is installed on a pole surface, the pole surface may be referred to as an installation interface.

In some embodiments of the present invention, the front housing may include N rigid protective sheets in a one-to-one correspondence with the N substrates and a flexible connecting piece that connects the N rigid protective sheets. The flexible connecting piece may be, for example, a stretchable flexible connecting piece or a flexible connecting piece in another form.

For ease of better understanding and implementation of the foregoing technical solutions of the embodiments of the present invention, examples are given for description in the following with reference to the accompanying drawings.

Figure 2:
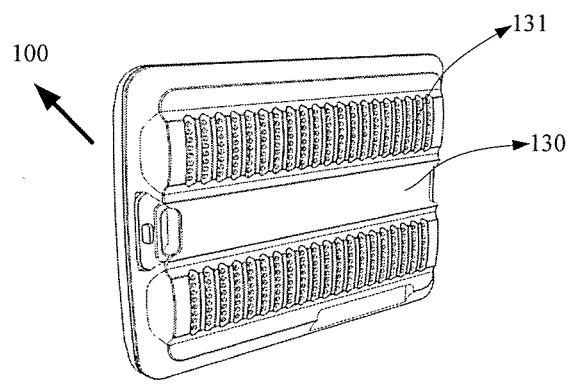
FIG. 2 is a schematic back view of a base station 100 in an unrolled state according to an embodiment of the present invention.

Referring to FIG. 1 and FIG. 2, FIG. 1 is a schematic front view of a base station 100 in an unrolled state according to an embodiment of the present invention. A front housing 110 of the base station 100 can be seen from the front. Referring to FIG. 2, FIG. 2 is a schematic back view of a base station 100 in an unrolled state according to an embodiment of the present invention. A back housing 130 of the base station 100 and a heat dissipation device 131 installed on the back housing can be seen from the back. Certainly, there may be one or more heat dissipation devices 131. Certainly, it is also possible that no heat dissipation device is disposed on the back housing (in the figure, at least two heat dissipation devices being disposed on the back housing is used as an example). The base station 100 in an unrolled state may be installed on a planar installation interface, for example, a wall surface.

Figure 3:
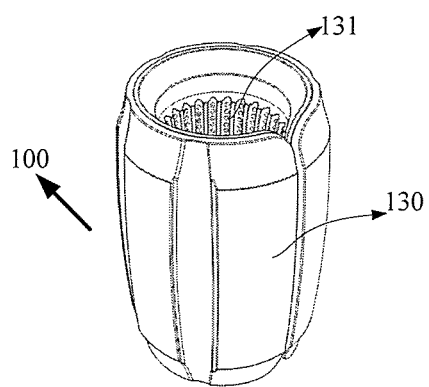
FIG. 3 is a schematic three-dimensional view of a base station 100 in a rolled-up state according to an embodiment of the present invention.
Figure 4:
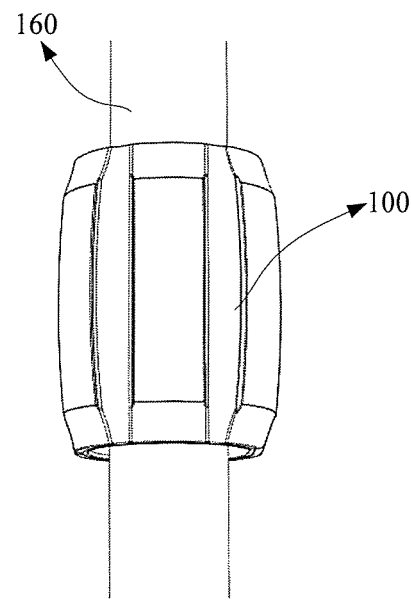
FIG. 4 is a schematic diagram of a base station 100 in a rolled-up state installed on a pole 160 according to an embodiment of the present invention.

Referring to FIG. 3, FIG. 3 is a schematic three-dimensional view of a base station 100 in a rolled-up state according to an embodiment of the present invention. FIG. 4 is a schematic diagram of a base station 100 in a rolled-up state installed on a pole 160 (for example, a utility pole) according to an embodiment of the present invention. It can be seen that the base station 100 in a rolled-up state can blend in with the pole 160 and does not develop a sense of mismatch with a surrounding environment.

It can be seen that because an installation form of the base station 100 can be adjusted according to an installation interface, the base station 100 in a rolled-up state is installed on the pole 160 or other columnar installation interfaces, the base station 100 in an unrolled state may be installed, for example, on a wall surface or other planar installation interfaces, which helps the base station 100 to deeply blend in with a surrounding environment and reduces the sense of mismatch between the base station 100 and the surrounding environment as much as possible.

Figure 5:
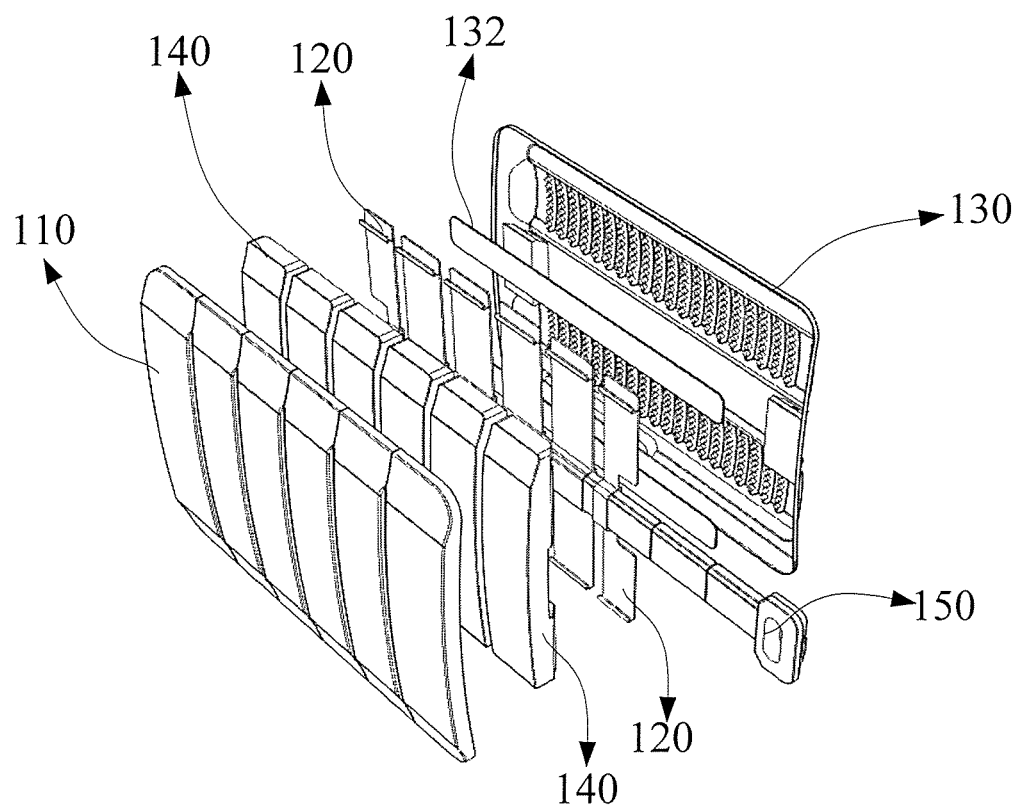
FIG. 5 is a schematic exploded view of a base station 100 according to an embodiment of the present invention.

Referring to FIG. 5, FIG. 5 is a schematic exploded view of a base station 100 according to an embodiment of the present invention. The base station 100 shown in FIG. 5 may include: a front housing 110, a back housing 130, N (in the figure, N being equal to 6 is used as an example) base station processing modules 140, N substrates 120, a deformable hinge pin 150, an elastic component 132, and the like.

The N substrates 120 are secured on the elastic component 132, and the elastic component 132 is secured on the back housing 130. The N base station processing modules 140 may be separately secured on the N substrates 120.

The elastic component 132 can drive the N substrates 120 to be arranged in a straight line, and the elastic component 132 can also drive, by deformation, the N substrates 120 to be arranged in a curve. The front housing 110 and the back housing 130 may each include a soft-material component, so that the front housing 110 and the back housing 130 can deform adaptively as the elastic component 132 deforms.

In some embodiments of the present invention, there may be one or at least two elastic components 132, and in FIG. 5, the number of the elastic components 132 being 2 is used as an example. It can be understood that disposing multiple elastic components 132 in the base station 100 helps improve installation stability and reliability of the base station.

Figure 6:
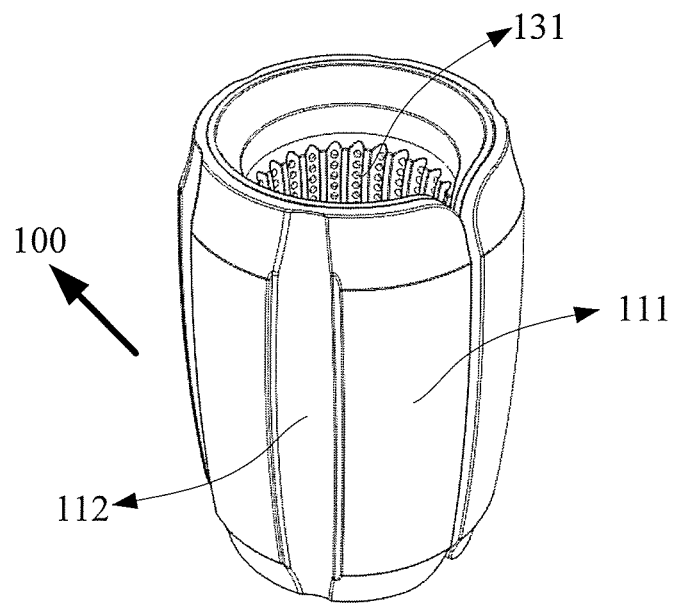
FIG. 6 is a schematic diagram of a base station 100 in a rolled-up state according to an embodiment of the present invention.

For example, as shown in FIG. 6, the front housing 110 may include N rigid protective sheets 111 in a one-to-one correspondence with the N substrates 120 and a flexible connecting piece 112 that connects the N rigid protective sheets. The flexible connecting piece 112 may be, for example, a stretchable flexible connecting piece (of which a shape may be similar to a web) or a flexible connecting piece in another form. In FIG. 6, the flexible connecting piece 112 being a web-shaped extensible flexible connecting piece is used as an example.

The base station processing module 140 mainly refers to a module that provides functions related to a communication function of the base station. The base station processing module 140 includes at least one of the following modules: a baseband module, a radio frequency module, an antenna module, a power source module, a signal transmission device, and a backup power module. Certainly, the base station processing module 140 may also be another module that provides functions related to a communication function of the base station.

In some embodiments of the present invention, the base station processing module 140 may be secured on the substrate 120 by using a slot disposed on the substrate 120. That is, the base station processing module 140 may be secured on the substrate 120 in a pluggable manner for convenience of disassembly. Certainly, the base station processing module 140 may also be secured on the substrate 120 by means of screwing, welding, or clamping or in other manners.

FIG. 5 shows that each of the N base station processing modules 140 is secured on a corresponding substrate 120 of the N substrates 120, that is, different base station processing modules 140 are secured on different substrates 120.

It can be seen that the base station 100 includes a front housing 110, N substrates 120, an elastic component 132, and a back housing 130; the N substrates 120 are secured on the elastic component 132, and the elastic component 132 is secured on the back housing 130; by performing modular arrangement for a base station processing module 140, the elastic component 132 can drive the N substrates 120 to be arranged in a straight line, and the elastic component 132 can also drive, by deformation, the N substrates 120 to be arranged in a curve; and the front housing 110 and the back housing 120 each include a flexible material, so that the front housing 110 and the back housing 120 can deform adaptively as the elastic component deforms. In this way, an installation form of the base station 100 can be an unrolled form (for example, in a scenario in which the elastic component 132 drives the N substrates 120 to be arranged in a straight line), and can also be a rolled-up or partially rolled-up form (for example, in a scenario in which the elastic component 132 drives the N substrates 120 to be arranged in a curve (for example, arranged in a closed curve)). It can be seen that by using such a structure the base station 100 can be in various installation forms, which is conducive to enhancing an extent of blending an installation form of the base station 100 with an environment.

Figure 7:
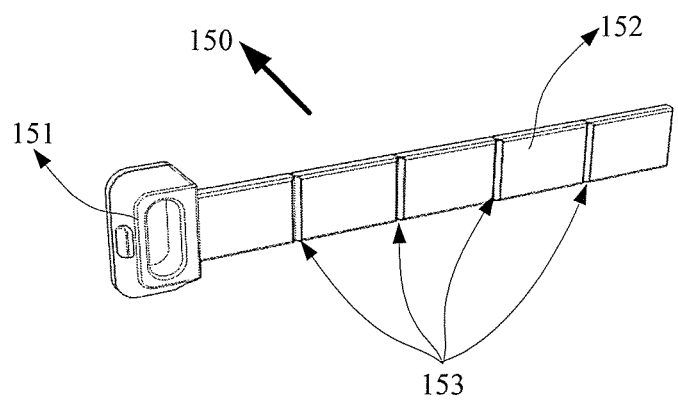
FIG. 7 is a schematic diagram of a deformable hinge pin 150 in an unrolled state according to an embodiment of the present invention.
Figure 8:
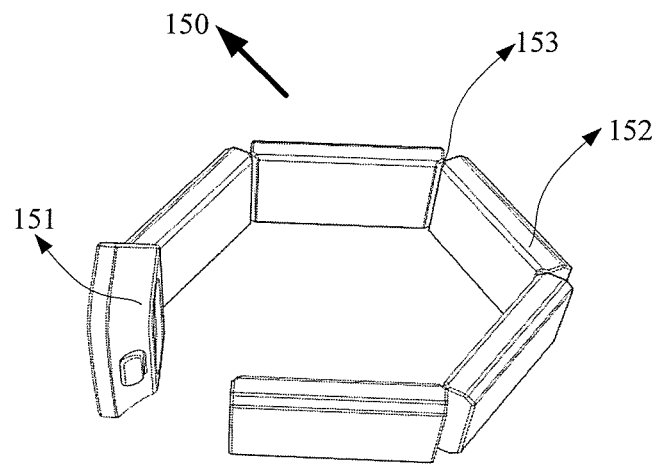
FIG. 8 is a schematic diagram of a deformable hinge pin 150 in a curly state according to an embodiment of the present invention.

Referring to FIG. 7 and FIG. 8, FIG. 7 is a schematic diagram of a deformable hinge pin 150 in an unrolled state, and FIG. 8 is a schematic diagram of a deformable hinge pin 150 in a curly state. The deformable hinge pin 150 may include a handle 151, N hinge pin subsections 152, and rotating shafts 153 connecting the N hinge pin subsections 152.

Figure 9:
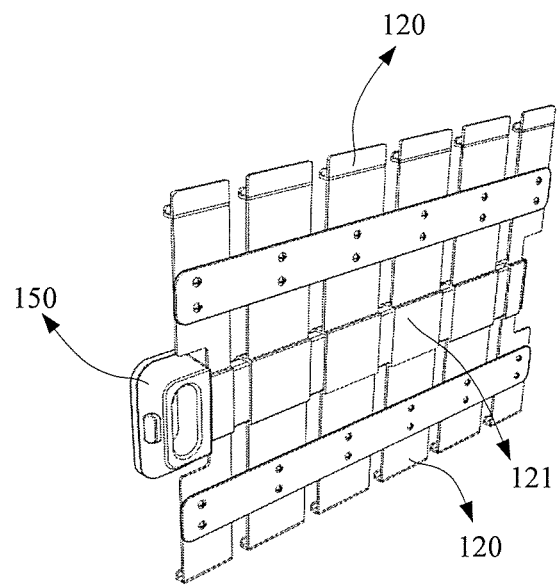
FIG. 9 is a schematic diagram of a deformable hinge pin 150 fitting N substrates 120 according to an embodiment of the present invention.
Figure 10:
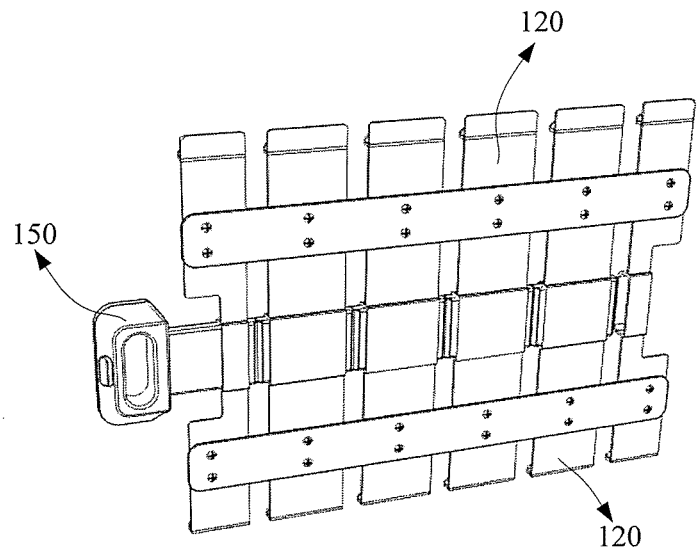
FIG. 10 is another schematic diagram of a deformable hinge pin 150 fitting N substrates 120 according to an embodiment of the present invention.

Referring to FIG. 9 and FIG. 10, FIG. 9 and FIG. 10 are two schematic diagrams of the deformable hinge pin 150 fitting N substrates 120. The N substrates 120 are further provided with hinge pin jacks 121, where the deformable hinge pin 150 can be partially or entirely inserted into the hinge pin jacks 121 on the N substrates 120, and/or the deformable hinge pin 150 can be partially or entirely pulled out of the hinge pin jacks 121 on the N substrates 120. An unrolling degree of the base station 100 can be flexibly controlled by partially or entirely inserting/pulling the deformable hinge pin 150 into/out of the hinge pin jacks 121 on the N substrates 120.

In some embodiments of the present invention, the N hinge pin subsections may be in a one-to-one correspondence with the N substrates 120, and the length of any hinge pin subsection 152 of the N hinge pin subsections 152 fits the width of a substrate 120 corresponding to any of the hinge pin subsections 152. For example, the length of any hinge pin subsection 152 of the N hinge pin subsections 152 is less than or equal to the width of a substrate 120 corresponding to any of the hinge pin subsections 152. A deformable hinge pin, which uses a rotating shaft to connect N hinge pin subsections, can flexibly control an unrolling degree of the base station.

For example, as shown in FIG. 9, when each hinge pin subsection 152 and the corresponding substrate 120 completely overlap, because the rotating shaft 153 is rotatable, in this condition, the elastic component can drive the N substrates 120 to be arranged in a straight line, and the elastic component can also drive, by deformation, the N substrates 120 to be arranged in a curve. Therefore, the N substrates 120 can be in an unrolled form and a rolled-up or partially rolled-up form.

For example, as shown in FIG. 10, when each hinge pin subsection 152 and the corresponding substrate 120 do not completely overlap (for example, the deformable hinge pin 150 is partially pulled out), because the hinge pin subsection 152 restrains, to a great extent, the N substrates 120 from being arranged in a curve, in this condition, the elastic component 132 can drive the N substrates 120 to be arranged in a straight line, but it is difficult for the elastic component 132 to drive, by deformation, the N substrates 120 to be arranged in a curve. Therefore, the N substrates 120 can be in an unrolled form, but it is difficult to make the N substrates be in a rolled-up form.

Figure 11:
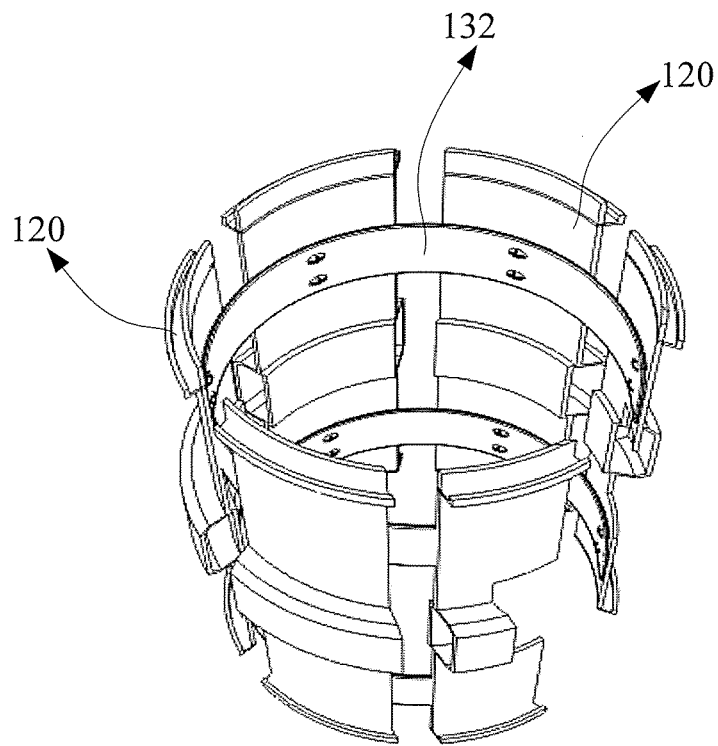
FIG. 11 is a schematic diagram of an elastic component 132 driving, by deformation, N substrates 120 to be arranged in a curve according to an embodiment of the present invention.

FIG. 11 shows that the elastic component 132 drives, by deformation, the N substrates 120 to be arranged in a curve so that the N substrates 120 is in a rolled-up form.

Figure 12:
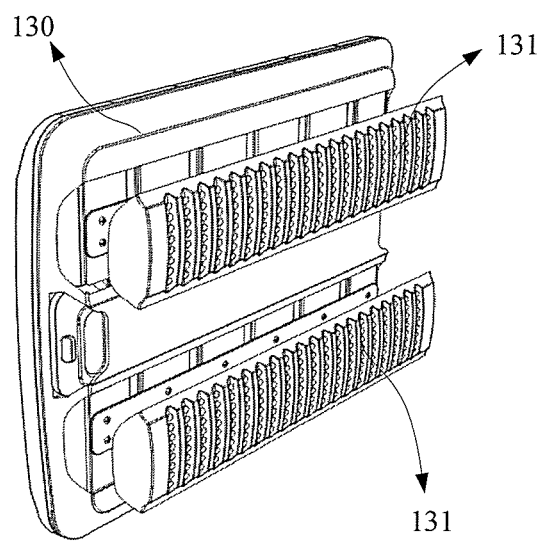
FIG. 12 is a schematic diagram of a detachable or an undetachable heat dissipation device 131 disposed on a surface, in contact with an installation interface, of a back housing 130 according to an embodiment of the present invention.

Referring to FIG. 12, a detachable or an undetachable heat dissipation device 131 may be further disposed on a surface, in contact with an installation interface, of the back housing 130. The heat dissipation device 131 may be made of, for example, a flexible material (for example, rubber) provided with a heat dissipation air duct.

The heat dissipation device 131 is designed to use a detachable structure with the purpose of easy replacement and adapting heat dissipation devices of different thickness to different pole diameters. The heat dissipation device 131 may be installed on the back housing by means of clamping or screwing.

The heat dissipation device 131 is configured to form a clearance between the base station and an installation surface (a pole or wall surface) to facilitate ventilation and meet a need for heat dissipation, and increase friction between the device and the installation surface, so that installation is more reliable; when the base station needs to be installed on a pole, the disposed heat dissipation modules of different thickness may help the device to adapt to poles of different diameters.

It can be seen that because there are at least two modes (including a flat wall-mounted installation mode, a rollable pole installation mode, and the like) for installing the base station 100, optimal environmental adaptability can be achieved; a modular design is used for the base station 100, and a base station processing module is installed on N substrates that can be arranged in a curve, so that the device can cling to a pole more securely, thereby achieving an optimal installation effect.

Further, at least one elastic component is used to secure the N substrates, and the elastic component can produce a natural embracing force, so that it is not required to use a hoop in a process of installing the device on a pole, thereby facilitating implementation of tool-free installation. An installation form of a product can be set conveniently by staggering design and position change of the substrates and the rotating shafts 153. In one installation form, the rotating shafts 153 and joints of the substrates are staggered to implement locking of an arrangement form of the substrates. In another installation form, by pulling, the rotating shafts 153 and rotating shafts of the substrates are aligned to implement unlocking, so that the substrates can be arranged along a curve.

In addition, the handle 151 may also be used as a handle for lifting and transferring.

The base station 100 provided by the embodiment of the present invention has an impact form and does not seem obtrusive in main pole and wall-mounted installation scenarios. Operations such as installation and deployment, angle adjustment, and maintenance for a small-cell base station become more convenient and efficient, so as to implement quick deployment and reduce disturbance to surrounding transportation and residents.

Another embodiment of the present invention provides a base station installation apparatus included in a base station, which may include:

a front housing, N substrates (configured to secure a base station processing module), an elastic component, and a back housing, where the N substrates are secured on the elastic component, and the elastic component is secured on the back housing and/or the front housing. The substrate is configured to secure a base station processing module.

The elastic component can drive the N substrates to be arranged along a straight line, and the elastic component can also drive, by deformation, the N substrates to be arranged along a curve. The front housing and the back housing are each provided with a deformable structure, so that the front housing and the back housing can deform adaptively as the elastic component deforms (for example, the deformable structures of the front housing and the back housing may include a soft-material component (the soft-material component may be a part of the front housing or the back housing, or the front housing or the back housing may be formed of the soft-material component), a movable component (the movable component may be a part of the front housing or the back housing, or the front housing or the back housing may be formed of the movable component), or the like, so that the front housing and the back housing can deform adaptively as the elastic component deforms), where N is an integer greater than 1.

When the base station installation apparatus is used to install a base station, a base station processing module may be secured on at least one substrate of the N substrates. The base station processing module mainly refers to a module providing functions related to a communication function of the base station. The base station processing module includes at least one of the following modules: a baseband module, a radio frequency module, an antenna module, a power source module, a signal transmission device, and a backup power module. Certainly, the base station processing module may also be another module providing functions related to a communication function of the base station.

In some embodiments of the present invention, the base station processing module may be secured on the substrate by using a slot disposed on the substrate. That is, the base station processing module may be secured on the substrate in an insertable and removable manner, to facilitate disassembly. Certainly, the base station processing module may also be secured on the substrate by means of screwing, welding, or clamping or in other manners.

For example, the base station may include N base station processing modules, where each of the N base station processing modules is secured on a corresponding substrate of the N substrates, that is, different base station processing modules are secured on different substrates. Certainly, one substrate may also have multiple base station processing modules secured thereon, or some substrates may even have no base station processing module secured thereon.

It can be seen that the base station installation apparatus includes a front housing, N substrates, an elastic component, and a back housing, where the N substrates are secured on the elastic component, and the elastic component is secured on the back housing and/or the front housing; by performing modular arrangement for a base station processing module, the elastic component can drive the N substrates to be arranged in a straight line, and the elastic component can also drive, by deformation, the N substrates to be arranged in a curve; and the front housing and the back housing are each provided with a deformable structure, so that the front housing and the back housing can deform adaptively as the elastic component deforms. In this way, an installation form of the base station can be an unrolled form (for example, in a scenario in which the elastic component drives the N substrates to be arranged in a straight line), and can also be a rolled-up or partially rolled-up form (for example, in a scenario in which the elastic component drives the N substrates to be arranged in a curve (for example, arranged in a closed curve)). By using such a structure, a base station can be in various installation forms, which is conducive to enhancing an extent of blending the installation form of the base station with an environment.

In some embodiments of the present invention, there may be one or at least two elastic components. It can be understood that disposing multiple elastic components in the base station facilitates improvement of installation stability and reliability of the base station.

In some embodiments of the present invention, the base station installation apparatus further includes a rigid hinge pin, where the N substrates are further provided with hinge pin jacks, where the rigid hinge pin can be inserted into a hinge pin jack on at least one substrate of the N substrates, and/or the rigid hinge pin can be partially or entirely pulled out of a hinge pin jack on at least one substrate of the N substrates. An unrolling degree of the base station can be flexibly controlled by inserting/pulling the rigid hinge pin into/out of a hinge pin jack on at least one substrate of the N substrates. For example, when the rigid hinge pin is inserted into all the hinge pin jacks on the N substrates, due to restraint from the rigid hinge pin, in this condition, the elastic component can drive the N substrates to be arranged along a straight line, but it is difficult for the elastic component to drive, by deformation, the N substrates to be arranged along a curve. When the rigid hinge pin is inserted into hinge pin jacks of some substrates of the N substrates, because the rigid hinge pin restrains, to some extent, some substrates of the N substrates from being arranged along a curve, in this condition, the elastic component can drive the N substrates to be arranged in a straight line, and the elastic component can also drive, by deformation, some substrates of the N substrates to be arranged in a curve. When the rigid hinge pin is pulled out of the hinge pin jacks on the N substrates, because restraint from the rigid hinge pin does not exist any longer, in this condition, the elastic component can drive the N substrates to be arranged in a straight line, and the elastic component can also drive, by deformation, a part or all of the N substrates to be arranged in a curve.

In some other embodiments of the present invention, the base station installation apparatus may further include a deformable hinge pin, where the N substrates are further provided with hinge pin jacks, where the deformable hinge pin can be inserted into a hinge pin jack on at least one substrate of the N substrates, and/or the deformable hinge pin can be partially or entirely pulled out of a hinge pin jack on at least one substrate of the N substrates. An unrolling degree of the base station can be flexibly controlled by partially or entirely inserting/pulling the deformable hinge pin into/out of a hinge pin jack on at least one substrate of the N substrates.

In some embodiments of the present invention, the deformable hinge pin may include: N hinge pin subsections and a rotating shaft connecting the N hinge pin subsections, where the N hinge pin subsections are in a one-to-one correspondence with the N substrates, and the length of any hinge pin subsection of the N hinge pin subsections fits the width of a substrate corresponding to any of the hinge pin subsections. For example, the length of any hinge pin subsection of the N hinge pin subsections is less than or equal to the width of a substrate corresponding to any of the hinge pin subsections. A deformable hinge pin, which uses a rotating shaft to connect N hinge pin subsections, can flexibly control an unrolling degree of the base station. For example, when each hinge pin subsection and the corresponding substrate completely overlap, because the rotating shaft is rotatable, in this condition, the elastic component can drive the N substrates to be arranged in a straight line, and the elastic component can also drive, by deformation, the N substrates to be arranged in a curve. Therefore, the N substrates can assume an unrolled form and a rolled-up or partially rolled-up form. When each hinge pin subsection and the corresponding substrate do not completely overlap, because the hinge pin subsection restrains, to a great extent, the N substrates from being arranged in a curve, in this condition, the elastic component can drive the N substrates to be arranged in a straight line, but it is difficult for the elastic component to drive, by deformation, the N substrates to be arranged in a curve. Therefore, the N substrates can be in an unrolled form, but it is difficult to make the N substrates be in a rolled-up form.

In some embodiments of the present invention, a detachable or an undetachable heat dissipation device may be further disposed on a surface, in contact with an installation interface of the back housing. The heat dissipation device may be made of, for example, a flexible material (for example, rubber) provided with a heat dissipation air duct.

In some embodiments of the present invention, the front housing may include N rigid protective sheets in a one-to-one correspondence with the N substrates and a flexible connecting piece that connect the N rigid protective sheets. The flexible connecting piece may be, for example, a stretchable flexible connecting piece or a flexible connecting piece in another form.

It can be seen that the base station installation apparatus included in a base station includes a front housing, N substrates, an elastic component, and a back housing, where the N substrates are secured on the elastic component, and the elastic component is secured on the back housing and/or the front housing; by performing modular arrangement for a base station processing module, the elastic component can drive the N substrates to be arranged in a straight line, and the elastic component can also drive, by deformation, the N substrates to be arranged in a curve; and the front housing and the back housing are each provided with a deformable structure, so that the front housing and the back housing can deform adaptively as the elastic component deforms. In this way, an installation form of the base station can be an unrolled form (for example, in a scenario in which the elastic component drives the N substrates to be arranged in a straight line), and can also be a rolled-up or partially rolled-up form (for example, in a scenario in which the elastic component drives the N substrates to be arranged in a curve (for example, arranged in a closed curve)). By using such a structure, a base station can be in various installation forms, which is conducive to enhancing an extent of blending the installation form of the base station with an environment.

The heat dissipation device is designed to use a detachable structure with the purpose of easy replacement and adapting heat dissipation devices of different thickness to different pole diameters. The heat dissipation device may be installed on the back housing by means of clamping or screwing.

The heat dissipation device is configured to form a clearance between the base station and an installation surface (a pole or wall surface) to facilitate ventilation and meet a need for heat dissipation, and increase friction between the device and the installation surface, so that installation is more reliable; when the base station needs to be installed on a pole, disposed heat dissipation modules of different thickness may help the device to adapt to poles of different diameters.

It can be seen that because there are at least two modes (including a flat wall-mounted installation mode, a rollable pole installation mode, and the like) for installing the base station, optimal environmental adaptability can be achieved; a modular design is used for the base station, and a base station processing module is installed on N substrates that can be arranged in a curve, so that the device can cling to a pole more securely, thereby achieving an optimal installation effect.

Further, at least one elastic component is used to secure the N substrates, and the elastic component can produce a natural embracing force, so that it is not required to use a hoop in a process of installing the device on a pole, thereby facilitating implementation of tool-free installation. An installation form of a product can be set conveniently by staggering design and position change of the substrates and the rotating shafts. In one installation form, the rotating shafts and joints of the substrates are staggered to implement locking of an arrangement form of the substrates. In another installation form, by pulling, the rotating shafts and rotating shafts of the substrates are aligned to implement unlocking, so that the substrates can be arranged in a curve.

The base station installation apparatus provided by the embodiment of the present invention is impact in form and matches main pole and wall-mounted installation scenarios. Operations such as installation and deployment, angle adjustment, and maintenance for a small-cell base station can be performed in a more convenient and efficient way, which achieves quick deployment and reduces disturbance to surrounding transportation and residents.

In the foregoing embodiments, the description of each embodiment has respective focuses. For a part that is not described in detail in an embodiment, reference may be made to related descriptions in other embodiments.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device, and may specifically be a processor in a computer device) to perform all or a part of the steps of the foregoing methods described in the embodiments of the present invention. The foregoing storage medium includes: any medium that can store program code, such as a USB flash drive, a read-only memory (ROM, Read-Only Memory), a random access memory (RAM, Random Access Memory), a removable hard disk, a magnetic disk, or an optical disc.

What is claimed is:
1. An apparatus, comprising:
a front housing, N substrates, an elastic component, and a back housing,
wherein the N substrates are secured on the elastic component, the elastic component is secured on the back hous- ing or the front housing, and the substrate is configured to secure a base station processing module;

the elastic component can drive the N substrates to be arranged in a straight line, and the elastic component can also drive, by deformation, the N substrates to be arranged in a curve; and the front housing and the back housing are each provided with a deformable structure, so that the front housing and the back housing can deform adaptively as the elastic component deforms, wherein N is an integer greater than 1.

2. The apparatus according to claim 1, further comprising a deformable hinge pin; and wherein the N substrates are further provided with hinge pin jacks, and the deformable hinge pin can be inserted into a hinge pin jack on at least one substrate of the N substrates or the deformable hinge pin can be partially or entirely pulled out of the hinge pin jacks on the N substrates.

3. The apparatus according to claim 2, wherein the deformable hinge pin comprises:

N hinge pin subsections and a rotating shaft connecting the N hinge pin subsections, wherein the N hinge pin subsections are in a one-to-one correspondence with the N substrates, and the length of any one hinge pin subsection of the N hinge pin subsections fits the width of a substrate corresponding to any of the hinge pin subsections.

4. The apparatus according to claim 1, further comprising a rigid hinge pin; and wherein the N substrates are further provided with hinge pin jacks, and the rigid hinge pin can be inserted into a hinge pin jack on at least one substrate of the N substrates, or the rigid hinge pin can be partially or entirely pulled out of the hinge pin jacks on the N substrates.

5. The apparatus according to claim 1, wherein the heat dissipation device is made of a flexible material provided with a heat dissipation air duct.

6. The apparatus according to claim 1, wherein the front housing comprises:

N rigid protective sheets in a one-to-one correspondence with the N substrates and a flexible connecting piece that connects the N rigid protective sheets.

7. The apparatus according to claim 6, wherein the flexible connecting piece is a stretchable flexible connecting piece.

8. A base station, comprising:

the apparatus according to claim 1, wherein at least one substrate of the N substrates in the apparatus has a base station processing module secured thereon.

9. The base station according to claim 8, wherein the base station processing module is secured on the substrate by using a slot disposed on the substrate.

10. The base station according to claim 9, wherein the base station processing module comprises at least one of the following modules: a baseband module, a radio frequency module, an antenna module, a power source module, a signal transmission device, and a backup power module.

* * * * *